United States Patent [19]

Cherukuri et al.

[11] Patent Number: 4,765,991

[45] Date of Patent: Aug. 23, 1988

[54] REDUCED CALORIE CHEWING GUMS AND METHOD

[75] Inventors: Subraman R. Cherukuri, Towaco, N.J.; Frank Hriscisce, Astoria, N.Y.; You C. Wei, Bethlehem, Pa.

[73] Assignee: Warner-Lambert Company, Morris Plains, N.J.

[21] Appl. No.: 859,108

[22] Filed: May 2, 1986

[51] Int. Cl.$^4$ .............................................. A23G 3/30
[52] U.S. Cl. ...................................... 426/3; 426/548; 426/804; 426/6
[58] Field of Search ........................................ 426/3–6, 426/548, 804

[56]   References Cited

U.S. PATENT DOCUMENTS

| | | | |
|---|---|---|---|
| 3,971,857 | 7/1976 | Furda | 426/548 |
| 4,065,578 | 12/1977 | Reggio | 426/548 |
| 4,241,090 | 12/1980 | Stroz et al. | 426/4 |
| 4,252,830 | 2/1981 | Kehoe | 426/548 |
| 4,357,354 | 11/1982 | Kehoe | 426/548 |
| 4,382,963 | 5/1983 | Klose | 426/3 |
| 4,500,547 | 2/1985 | Puglia et al. | 426/548 |

OTHER PUBLICATIONS

Pfizer—Polydextrose Research Bulletin, Centra Research Groton, Conn.

Primary Examiner—Jeanette Hunter
Attorney, Agent, or Firm—Charles A. Gaglia, Jr.; Daniel A. Scola; Sandra Gusciora Field

[57]   ABSTRACT

A highly palatable low calorie chewing gum composition with enhanced mouth-feel and improved chew having from about 5 to about 10% polysaccharide, a high amount of non-SBR/PVA gum base and a sweetener.

14 Claims, No Drawings

REDUCED CALORIE CHEWING GUMS AND METHOD

FIELD OF THE INVENTION

The present invention relates to a highly palatable low calorie chewing gum composition with enhanced mouth-feel and improved chew having high amounts of a non-styrene-butadiene copolymer/polyvinyl acetate (non SBR/PVA) elastomer chewing gum base, and low amounts of a polysaccharide and as a sweetener one or more suger, sugar alcohol, artifical sweetener, and dipeptide based sweetener such that the calorie content of the chewing gum composition is at most only two thirds that of conventional sugar-containing or sugar alcohol containing chewing gum.

DESCRIPTION OF THE PRIOR ART

To reduce calories in chewing gum it is necessary to replace the soluble sugar and sugar alcohol bulking agents with low calorie alternatives. The soluble sugar and sugar alcohol bulking agents not only impart necessary sweetness but also a discontinuity to the gum base which results in a softer more pleasant chew and mouth feel.

Most reduced or light calorie chewing gum compositions generally contain about 25% by weight of a water insoluble gum base, inert fillers or texturizing agents in amounts of at least 40% by weight up to 90% or more, a water soluble flavoring agent and water soluble sweeeners such as sucrose and corn syrup or in sugarless gum sorbitol, mannitol and artificial sweeteners. Also incorporated within the gum base may be plasticizers or softeners to improve consistency and texture of the gum. The gum base of reduced or light calorie chewing gum generally contains a natural rubber gum base, a synthetic rubber gum and/or mixtures thereof. When synthetic gum bases are utilized, the preferred elastomer component has been the styrene-butadiene copolymer (SBR). Gum base is non-caloric and insoluble, a chewing gum composition high in gum base content would also be reduced in calories. Previous attempts to produce such high gum base content low calorie chewing gum compositions have resulted in products with a hard chew and poor texture.

Reduced calories, low calorie, and no calorie chewing gum compositions are well known. Prior attempts to produce a reduced calorie chewing gum composition have relied on high levels of inert fillers or texturizing agents to replace the sugars and sugar alcohols used as both bulking and sweetening agents in conventional chewing gums.

In U.S. Pat. No. 4,382,963, Klose, et al. discloses a sugar-free, low calorie chewing gum utilizing polydextrose as the sole soluble bulking agent. From 65% to 85% by weight polydextrose is incorporated into gum base to form a sugar-free, unsweetened, chewing gum with a caloric density of less than one calorie per gram.

In U.S. Pat. Nos. 4,252,830 and 4,357,354 Kehoe, et al. disclose a substantially calorie-free chewable chewing gum base which includes gum base containing high levels of inert fillers, such as calcium carbonate or talc in amounts of at least about 40% by weight. The chewable gum base includes at least 10% air voids entrapped in the gum base matrix which, upon chewing, becomes filled with moisture causing a dramatic increase in bolus volume.

In U.S. Pat. No. 4,241,091, Stroz, et al., disclose a substantially calorie-free, non-cariogenic, non-adhesive chewing gum consisting essentially of gum base, a substantially calorie-free sweetener, from 1 to 15% by weight of alpha-cellulose and from 1 to about 40% by weight water. The chewing gum of Stroz, et al., has a high bolus volume.

While the prior art compositions have been effective to make reduced calorie chewing gums, these formulations have resulted in chewing gums having a hard chew or off taste or poor texture because of the use of high levels of fillers, and texturizing agents. It has been believed that the use of high levels of fillers and texturizers was essential to obtain a soft chew product.

It would therefore be desirable to develop a reduced calorie chewing gum that offers a reduction in caloric content without the use of high filler content.

SUMMARY OF THE INVENTION

In accordance with the present invention, a highly palatable reduced calorie chewing gum having a low level of fillers and a high gum base content is provided which provides less than two-thirds the calories of conventional chewing gums and which has a mouth-feel, soft texture and chew similar to conventional chewing gums. The chewing gum of the invention contains a high amount of substantially calorie-free non-SBR/PVA gum base, a low amount of a polysaccharide, one or more sweeteners, flavors, softeners, wetting agents, lubricants, thickeners, fillers and water.

DETAILED DESCRIPTION

The reduced calorie chewing gum can be prepared in sugar or sugarless chewing gum combinations which can be made into a variety of products, e.g. stick, slab, chunk, balls, ropes, tablets and/or center filled gum products.

The present invention provides a chewing gum which is initially soft and chewable, has reduced calorie content and a desirable sweetness level. The chewing gum of the invention will have a calorie content of less than two-thirds and preferably less than 50% of that of conventional sugar containing and sugarless chewing gums with comparable sweetness.

As used in the specification and claims, the term "reduced calorie" shall mean having a calorie content two thirds or less that of conventional chewing gum, "light calorie" shall mean less than 50% of the calories of conventional chewing gum and the term "low calorie" shall mean having a calorie content of 0.4 calorie or less per gram of chewing gum. Conventional carbohydrate containing chewing gums contain 3 to 4 calories per gram.

While the invention is not to be limited to theoretical considerations, it is believed that when the non-SBR/PVA gum base, which is a chewable hydrophilic media, is combined with a water soluble polysaccharide, the water soluble polysaccharide imparts a discontinuity to the gum base. It is this discontinuity in combination with the hydrophilic character of non-SBA/PVA gum bases that results in chewing gum with a pleasant mouth feel, a nice chew character and a high bolus volume for its weight. This combination further results in the ability to use high amounts of gum base without producing hard or rubbery chewing gum compositions. It is the ability to use high gum base concentrations in combination with a low caloric polysaccharide that results in unique reduced calorie compositions.

The further ability to incorporate non-caloric fillers and cellulose permits the production of reduced, light or low calorie chewing gum compositions.

The chewing gum compositions of the instant invention contain a non-SBR/PVA gum base. The amount of non-SBR/PVA gum base employed will vary greatly depending on various factors such as the intended calorie content of the final product, the type of base used and other components used to make the final product. In general, gum base amounts of about 35% to about 94% by weight of the final chewing gum composition are acceptable for use in reduced calorie chewing gum compositios with preferred amounts of about 35% to about 85% and most preferred amounts from about 35% to about 70% by weight.

The non-SBR/PVA gum base provides a hydrophilic chew character to the chewing gum. This results in a pleasant moist chew.

The gum base used in this invention may be any non-SBR water-insoluble gum base having polyvinyl acetate (PVA) as an essential ingredient. Such gum bases are known in the art and are not the subject of this invention. An example of such a non-SBR/PVA containing gum base is found in U.S. Pat. No. 4,490,395. Illustrative examples of suitable polymers in gum bases include, without limitation, substances of vegetable origin such as chicle, jelutong, gutta percha and crown gum and synthetic elastomers such as isobutylene-isoprene copolymers, polyethylene, polyisobutylene and polyvinylacetate and mixtures thereof are particularly useful.

The gum base composition contains elastomer solvents to aid in softening the polymer component. Such elastomer solvents may comprise methyl, glycerol or pentaerythritol esters of rosins or modified rosins, such as hydrogenated dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of alpha-pinene or beta-pinene and mixtures thereof. The elastomer solvent may be employed in an amount ranging from about 3% to about 55% and preferably about 8% to about 38% by weight of the gum base. Amounts below about 3% cause the chew characteristic to be hard and result in inconsistent flavor release. Amounts above 55% cause a soft product to be formed which destroys the chew characteristic.

Vinyl polymers, and in particular polyvinyl acetate (PVA) is an essential ingredient. The preferred PVA has a molecular weight of at least 2,000. Such materials are commercially available in various molecular weights which can be successfully used. The polyvinyl acetate is employed in amounts of about 5% to about 45% by weight and preferably 7% to 35% by weight. These materials when used in such high amounts aid in extending the elastomer mixture while maintaining product integrity. Amounts below about 5% cause the base to be unstable. Amounts above 45% cause segregation of gum constituents to occur.

It is essential to employ glyceryl monostearate as an emulsifier. When absent the formulation has poor stability and lacks acceptable texture. It is believed that the glyceryl monostearate aids in bringing the normally immiscible constituents together in such a way that they form a single finely dispersed stable system. This emulsifier also simplifies the incorporation of flavors into the final base and aids in retaining finely divided solids within the gum base complex. The glyceryl monostearate is employed in amounts of about 1% to about 15% and preferably about 3% to about 9%. Additional emulsifiers may also be included, notably lecithin, fatty acid and monoglycerides, diglycerides and, triglyceride, propylene glycol monostearate and mixtures thereof. Such materials may be used in the amount of about 1% to about 25% by weight.

The gum base formulation must employ a wax material. The waxes have been found to soften the polymer elastomer mixture and improve elasticity of the chew character. The waxes employed are preferably microcrystalline wax, paraffin wax, and mixtures thereof. Useful amounts are from about 2% to about 25% by weight and preferably from about 2.5% to about 20% by weight of the gum base composition. Preferably these waxes are used in combination in amounts of about 5% to about 20% microcrystalline wax and about 3% to about 15% paraffin wax.

A variety of traditional ingredients such as plasticizers or softeners may optionally be added. Such materials are optional and not essential in the present formulation. Such materials include hydrogenated vegetable oils, lanolin, stearic acid, sodium stearate, potassium stearate, glyceryl triactate, triacetin, glycerin and the like and mixtures thereof. Such materials when incorporated into the gum base obtain a variety of desirable textures and consistency properties. These individual materials are generally employed in amounts of up to about 30%, preferably about 1% to about 25% by weight and most preferably in amounts of from about 1.5% to about 12% by weight of the gum base composition. Because of the low molecular weight of these compounds, they are able to penetrate the fundamental structure of the base making it plastic and less viscous.

The polysaccharide used herein is a water-soluble, low calorie, non-cariogenic bulking agent which contributes the bulk and texture normally obtained with sugars and sugar alcohols. In a preferred embodiment, the water soluble polysaccharide is selected from the group consisting of polydextrose, polymaltose, modified polydextrose and mixtures thereof. The polysaccahride is present in an amount from about 5% to about 10% by weight of the chewing gum composition and preferably about 6 to about 9%. Polysaccharide content of less than 5% will not provide sufficient discontinuity of the gum base. Polysaccharide content of greater than 10% results in an off taste. The preferred polysaccharide is polydextrose. Polydextrose is a water-soluble, randomly bonded polymer of glucose containing minor amounts of sorbitol end groups and bound citric acid and has an average molecular weight of about 1500, ranging from about 162 to about 20,000. Polydextrose is a bland tasting material having about one calorie per gram.

Cellulose is employed as a no calorie filling, texturizing agent and is employed to further reduce the calorie content of the chewing gum. The cellulose used herein is water insoluble and may be present in the invention in amounts up to about 7% preferably 1 to 6% and most preferably 3 to 6% by weight. Without being limited to particular celluloses, representative illustrations encompass: alpha cellulose, microcrystalline cellulose, powder cellulose which is composed of 90% beta-1, 4-glucan and 10% galactan hydroxypropyl methylcellulose, cellulose flour and the like. While not essential, the average particle size of the cellulose may range from about 3 microns to about 50 microns, preferably about 5 microns to about 30 microns and most preferably about 5 microns to about 20 microns.

Optionally, bulking agents such as fillers may also be employed. Illustrative fillers may include calcium carbonate, talc, aluminum hydroxide, alumina, aluminum silicates, calcium phosphates (anhydrous and dihydrate) and combinations thereof. Preferably the amount of filler when used will vary up to about 10% by weight of the chewing gum composition.

A thickening agent may be used as a binder for the chewing gum matrix. The thickening agent used herein may be water soluble or water swellable. A thickening agent will absorb and tightly hold water, decreasing its mobility and rate of vaporization. In the chewing gum composition the thickening agent prevents segregation of the gum components. The thickening agent can comprise a gum, mixtures of gum, bulking agents, mixtures of bulking agents, or combinations of gums and bulking agents. Representative illustrations of thickening agents encompass: alginates, carrageenan, xanthan gum, gelatin, guar, gum arabic, carob, tragcanth, locust bean gum, karaya, pectin, agar, methylcellulose, sodium carboxymethylcellulose, carboxymethylcellulose, hydroxypropylcellulose, and similar compounds and mixtures thereof. The preferred thickening agent is sodium carboxymethylcellulose.

The thickening agent is present in the chewing gum formulation in amount from about 0.01% to about 5%, preferably about 0.01% to about 2% and most preferably about 0.01 to about 0.1% by weight.

The thickening agent may be added directly to the chewing gum during processing. Preferably the thickening agent is added as a premix comprising as weight percent of the premix:
about 40% to about 89.9% of a wetting agent, about 10 to about 59% water and about 0.1 to about 5% thickening agent.

The thickening agent premix is present in the chewing gum in an amount up to about 8%, preferably about 2% to about 7% and most preferably about 4% to about 7%.

Wetting agents are polar compounds which are hydrophilic and impart hydrophilic properties to the surface of solids they are in contact with. When solids to be wetted are water soluble or water swellable, the process of solubilizing or swelling is greatly accelerated by the wetting agent.

The wetting agent is utilized to facilitate water contact with the thickening agent thereby causing it to dissolve or swell rapidly. Wetting agents of the present invention are mono and poly alcohols such as ethanol, glycerin, sorbitol, propylene glycol, polyethylene glycol and the like and mixtures thereof. The preferred wetting agents are glycerin and sorbitol.

The premix is preferably prepared with an optional sweetening agent. When a sweetening agent is present in the premix, the premix comprises as weight percent of the premix about 40% to about 60% of a wetting agent, about 24% to about 45% sweetening agent, about 10 to about 35% water and about 0.1% to about 5% thickening agent.

Adding sweetening agent to the premix increases the total weight of the premix and results in the thickening agent being less concentrated in the premix. The larger weight, less concentrated premix, when added to the gum base more readily forms a uniform mixture with the gum base. The sweetening agent employed in the premix is the same as those utilized in the chewing gum composition as described below.

The thickening agent premix is prepared by first admixing the thickening agent with a wetting agent to form a uniform mixture. A wetting agent is added to the thickening agent prior to addition of water in order to facilitate rapid swelling of the thickening agent with water. With continued mixing, the water and optional sweetening agent are added. The sweetening agent may be predispersed or dissolved in the water before addition to the wetted thickening agent. Mixing is continued until the thickening agent swells and thickens. The premix is then added to the chewing gum composition as indicated in the process for its preparation.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, maltose, partially hydrolyzed starch or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and material described in U.S. Pat. No. 3,492,131 and the like.

In general, the amount of sweetener will vary with the desired amount of sweeteners selected for a particular chewing gum composition. This amount will normally be 0.005 to about 35% by weight when using an easily extractible sweetener. The water-soluble sweeteners described in category A above, are preferably used in amounts of about 5% to about 35% by weight, and most preferably from about 10% to about 35% by weight of the final chewing gum composition. In contrast, the artifical sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dixoide; emulsifiers such as lecithin and glyceryl monostearate; and fillers such as dicalcium phosphate, aluminum hydroxide, alumina, aluminum silicates, talc, calcium carbonate, and combinations thereof. The total amount of fillers present is generally up to about 10% by weight.

The colorants useful in the present invention, include the pigments that may be incorporated in amounts of up to about 6% by weight, and preferably up to about 1% by weight. A preferred pigment is titanium dioxide, also the colorants may include other dyes suitable for food, drug and cosmetic applications, and known as F.D. & C dyes and the like. The materials acceptable for the foregoing spectrum of use are preferably water-soluble. Illustrative examples include the indigo dye, known as F.D. & C. Blue No. 2, which is the disodium salt of 5,5-indigotindisulfonic acid. Similarly, the dye known as F.D. & C. Green No. 1, comprises a triphenylmethane dye and is the monosodium salt of 4-[4-N-ethyl-p-sulfobenzylamino)diphenylmethylene]-[1-(N-ethyl-N-p-sulfoniumbenzyl)-2,5-cyclohexadienimine]. A full recitation of all F.D. & C. and D. & C. colorants and their corresponding chemical structures may be found in the Kirk-Othmer Encyclopedia of Chemical Technology, 3rd Edition, in Volume 6, at pages 561–595 which text is accordingly incorporated herein by reference.

Flavoring agents well known to the chewing gum art may be added to the chewing gum compositions of the instant invention. These flavoring agents may be chosen from synthetic flavor oils and/or oils derived from plants, leaves, flowers, fruits and so forth, and combinations thereof. Representative flavor oils include: spearmint oil, cinnamon oil, oil of wintergreen (methylsalicylate) and peppermint oils. Also useful are artifical, natural or synthetic fruit flavors such as citrus oil including lemon, orange, grape, lime and grapefruit, and fruit essences including apple, strawberry, cherry, pineapple and so forth. The flavoring agent may be a liquid, spray dried, encapsulated, sorbed on a carrier and mixtures thereof.

The amount of flavoring agent employed is normally a matter of preference subject to such factors as flavor type, base type and strength desired. In general, amounts of about 0.05% to about 5.0% by weight of the final chewing gum composition are useable with amounts of about 0.3% to about 4.5% being preferred and about 0.7% to about 3.5% being most preferred.

The method for forming the reduced calorie chewing gum of the invention includes melting the gum base and mixing the base gum in a kettle with liquid softener and/or an emulsifier until a uniform mixture is formed. The soluble polysaccharide is added and mixed. The optional cellulose is added with the soluble polysaccharide when a lower calorie product is desired. The sweetening agent and flavor are added next with continued mixing. The optional thickeneing agent premix is added next and the mixing continued until a homogeneous mass is formed. The product is recovered from the kettle, and shaped to form stick, slab, chunk, balls, ropes, shredded, tablet and/or center filled gum products.

An illustrative process involves first melting the gum base at a temperature from about 70° C. to about 120° C. and mixing the gum base in a kettle with a liquid softener and/or a emulsifier for 2 to 8 minutes. The soluble polysaccharide is added with continued mixing. the optional cellulose is added with the soluble polysaccharide when a lower calorie product is desired. To this mixture, ⅜ to ¾ of the sweetening ingredients, optional fillers and colorants are added and mixing is continued for 1 to 4 minutes. To this mixture, the remaining sweetening ingredients are added and while mixing is continued, the flavoring agent is added slowly. The optional thickening agent premix is added next and the mixing continued until a homogeneous mass is formed. The gum is discharged from the kettle and formed into its desired shape such as sticks, slabs, chunks, balls, ropes, shredded, tablets and/or center filled.

The following examples serve to provide further appreciation of the invention but are not meant in any way to restrict the effective scope of the invention. All percentages throughout the specification are by weight percent of the final composition unless otherwise indicated.

EXAMPLE I

Inventive Runs A to D

This example demonstrates the formation of chewing gum compositions according to the invention.

The gum base is melted in a kettle with sigma blades at a temperature of 70° to 80° C. To the gum base, lecithin is added with mixing for 2 minutes. Polydextrose and cellulose are added and mixed. The carbohydrate sweetener, glycerin, optional filler and ½ of the flavor are added to the mix and mixed thoroughly for 3 minues. The thickener premix and remaining flavor are added and mixed to produce a homogeneous mass. The product is removed from the kettle rolled and scored.

TABLE I

| | Weight % EXAMPLE: | | | |
|---|---|---|---|---|
| Ingredient | A | B | C | D |
| Gum base | 44.775 | 35.675 | 35.675 | 50.21 |
| Sweetener | | | | |
| Sorbitol | 27.5 | 15.48 | 15.48 | 25.00 |
| Mannitol | — | 13.00 | 3.00 | — |
| Aspartame | 0.025 | — | — | — |
| Sodium Saccharin | — | — | — | 0.04 |
| Acesulfame K | — | — | — | — |
| Polydextrose | 9.00 | 9.00 | 9.00 | 6.00 |
| Cellulose | 6.00 | 6.00 | 6.00 | 4.00 |
| Glycerin | — | — | — | 12.00 |
| Lecithin | 0.60 | 0.6 | 0.6 | 0.6 |
| Water | 7.5 | 9.63 | 9.63 | — |
| Inert Filler | — | — | 10.00 | — |
| Flavor | 3.6 | 4.6 | 4.6 | 2.15 |
| Thickener premix | — | 6.0 | 6.0 | — |
| Calories per gram | 1.09 | 1.22 | 1.05 | 1.74 |

The chewing gum compositions of this example are found to have a nice chew character and a high bolus volume for their weight.

EXAMPLE 2

Comparative Runs E to H

This example demonstrates the formation of noninventive chewing gum compositions having no polysaccharide or too much polysaccaride or too much cellulose.

The gum base is melted in a kettle with sigma blades at a temperature of 70° to 80° C. To the gum base, lecithin is added with mixing for 2 minutes. Polydextrose and cellulose are added and mixed. The carbohydrate sweetener, glycerin and ½ of the flavor are added to the mix and mixed throughly for 3 minutes. The remaining flavor is added and mixed to produce a homogeneous mass. The product is removed from the kettle rolled and scored.

TABLE II

| | Weight % EXAMPLE: | | | |
|---|---|---|---|---|
| Ingredient | E | F | G | H |
| Gum base | 59.31 | 40.21 | 48.00 | 40.4 |
| Sweetener | | | | |
| Sorbitol | 25.00 | 25.00 | 28.40 | 21.00 |
| Mannitol | — | — | — | — |

TABLE II-continued

| Ingredient | Weight % EXAMPLE: | | | |
|---|---|---|---|---|
| | E | F | G | H |
| Sodium Saccharin | 0.04 | 0.04 | 0.045 | — |
| Polydextrose | — | 11.00 | 12.5 | 10.00 |
| Cellulose | 4.00 | 7.00 | 8.00 | 15.00 |
| Glycerin | 9.00 | 14.00 | — | — |
| Lecithin | 0.5 | 0.6 | 0.605 | 0.60 |
| Water | — | — | — | 9.00 |
| Inert Filler | — | — | — | — |
| Flavor | 2.15 | 2.15 | 2.35 | 4.0 |
| Thickener premix | — | — | — | — |
| Comments | Too Rubbery | Gum is too soft does not hold its own body, slightly rubbery chew. | Too hard initial chew. | Pasty-like chew. |

EXAMPLE 3

Inventive Run I

This example demonstrates the formation of a chewing gum composition according to the invention. The chewing gum is prepared by the procedure of Example 1.

| EXAMPLE: Ingredient | I |
|---|---|
| Gum base | 90. |
| Sweetener | |
| Sorbitol | — |
| Mannitol | — |
| Aspartame | 0.25 |
| Sodium Saccharin | — |
| Acesulfame K | 0.25 |
| Polydextrose | 5.00 |
| Cellulose | — |
| Glycerin | — |
| Lecithin | 0.70 |
| Water | — |
| Inert Filler | — |
| Flavor | 1.75 |
| Thickener premix | 2.00 |
| Calories per gram | 0.3 |

The chewing gum composition of this example exhibits a nice chew character and a high bolus volume.

This invention being thus described, it will be obvious that the same may be varied in many ways. Such variations are not to be regarded as a departure from the sprit and scope of the invention and all such modfications are intended to be included within the scope of the following claims.

We claim:

1. A highly palatable reduced calorie chewing gum composition comprising a high amount of a non-SBR/PVA chewing gum base, a low amount of a polysaccharide, cellulose, and a sweetening agent, by weight percent of the composition the non-SBR/PVA chewing gum base is present in an amount from about 35% to about 94%, by weight percent of the composition the polysaccharide is present in an amount from about 5% to about 10%, and by weight percent of the composition the cellulose is present in an amount up to about 7% and wherein the polysaccharide is selected from the group consisting of polydextrose, polymaltose, modified polydextrose and mixtures thereof.

2. The composition of claim 1 wherein the polysacchride is polydextrose.

3. The composition of claim 1 wherein the sweetening agent is present in an amount from about 0.005% to about 35% by weight of the composition.

4. The composition of claim 1 further including from about 0.01% to about 2% thickening agent selected from the group consisting of methylcellulose, alginates, carrageenan, xanthan gum, karaya, agar, gelatin, carob, tragacanth, locust bean gum, guar, gum arabic, pectin, carboxymethylcellulose, hydroxypropycellulose, sodium carboxymethylcellulose and mixtures thereof.

5. The composition of claim 1 wherein the chewing gum base is present in amount from about 35% to about 70% by weight of the composition.

6. The composition of claim 1 further including up to about 10% filler by weight of the composition.

7. The composition of claim 1 further including up to about 8% by weight of the composition of a thickening agent premix, wherein the thickening agent premix comprises by weight percent of the premix from about 40% to about 60% wetting agent, from about 12% to about 18% water, from about 22% to about 48% sweetener and from about 0.1 to about 5% thickening agent.

8. A method of preparing a reduced calorie chewing gum composition which comprises:
(1) admixing from about 35% to about 94% melted non-SBR/PVA chewing gum base with an emulsifier, about 5% to about 10% of by weight of the composition polysaccharide which is selected from the group consisting of polydextrose, polymaltose, modified polydextrose and mixtures thereof, up to about 7% cellulose, and a sweetening agent; (2) cooling the mix to form a chewing gum; and (3) recovering the product.

9. The method of claim 8 wherein the polysaccharide is polydextrose.

10. The method of claim 8 further admixing a thickening agent with the melted chewing gum base.

11. A method of preparing a reduced to low calorie chewing gum composition which comprises:
(a) admixing from about 35% to about 94% melted non-SBR/PVA chewing gum base with an emulsifier, cellulose in an amount up to about 7% by weight of the composition, about 5% to about 10% by weight of the composition of polysaccharide which is selected from the group consisting of polydextrose, polymaltose, modified polydextrose and mixtures thereof, a sweetening agent and optionally a flavoring agent to form a uniform mixture,
(b) preparing a thickening agent premix which comprises admixing a thickening agent with a wetting agent to form a wetted thickening agent, admixing the wetted thickening agent with water to swell and thicken the agent and produce a homogeneous mass,
(c) admixing the mixture of (a) with the premix of (b) cooling the resultant mix to form a chewing gum and recovering the product.

12. The method of claim 11 wherein the polysaccharide is polydextrose.

13. The method of claim 11 further admixing a sweetening agent with the thickening agent premix.

14. The method of claim 11 wherein the polysaccharide is present in an amount from about 5% to about 10% by weight of the composition, the cellulose is present in an amount of up to about 7%, and the sweetening agent is present in an amount from about 0.005% to about 35% by weight of the composition.

* * * * *